United States Patent
Koyama et al.

(10) Patent No.: US 10,187,638 B2
(45) Date of Patent: Jan. 22, 2019

(54) APPARATUS, METHOD FOR CODING VIDEO, AND NON-TRANSITORY COMPUTER-READABLE STORAGE MEDIUM FOR STORING PROGRAM FOR CODING VIDEO

(71) Applicant: FUJITSU LIMITED, Kawasaki-shi, Kanagawa (JP)

(72) Inventors: Junpei Koyama, Shibuya (JP); Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/729,808

(22) Filed: Oct. 11, 2017

(65) Prior Publication Data

US 2018/0124396 A1    May 3, 2018

(30) Foreign Application Priority Data

Nov. 2, 2016  (JP) .................................. 2016-214802

(51) Int. Cl.
*H04N 7/12* (2006.01)
*H04N 11/02* (2006.01)
(Continued)

(52) U.S. Cl.
CPC ......... *H04N 19/107* (2014.11); *H04N 19/124* (2014.11); *H04N 19/182* (2014.11); *H04N 19/186* (2014.11); *H04N 19/61* (2014.11)

(58) Field of Classification Search
None
See application file for complete search history.

(56) References Cited

U.S. PATENT DOCUMENTS

2009/0225871 A1* 9/2009 Omori .................. H04N 19/176
375/240.27
2012/0263237 A1* 10/2012 Koyama ................ H04N 19/61
375/240.16
(Continued)

FOREIGN PATENT DOCUMENTS

JP    2014-168107    9/2014

OTHER PUBLICATIONS

R. Joshi et al., "High Efficiency Video Coding (HEVC) Screen Content Coding: Draft 5", JCTVC-V1005, Joint Collaborative Team on Video Coding (JCT-VC) of ITU-T SG16 WP3 and ISO/IEC JTC1/SC29NVG11, Oct. 2015 (677 pages).
(Continued)

Primary Examiner — Talha M Nawaz
(74) Attorney, Agent, or Firm — Fujitsu Patent Center

(57) ABSTRACT

An apparatus for coding video in one of a plurality of prediction modes executes a first process for calculating first evaluation values regarding each of the plurality of prediction modes, based on a plurality of luminance prediction errors, each luminance prediction error being a difference between luminance of each pixel in an input image and luminance of each pixel in a prediction image, a plurality of color difference prediction errors, each color difference prediction error being a difference between a color difference of each pixel in the input image and a color difference of each pixel in the prediction image, and a calculation result of the luminance prediction errors and the color difference prediction errors; executes a second process for selecting a predetermined number of prediction modes from the prediction modes, based on the first evaluation values.

12 Claims, 5 Drawing Sheets

(51) Int. Cl.
*H04N 11/04* (2006.01)
*H04N 19/107* (2014.01)
*H04N 19/124* (2014.01)
*H04N 19/186* (2014.01)
*H04N 19/182* (2014.01)
*H04N 19/61* (2014.01)

(56) References Cited

U.S. PATENT DOCUMENTS

2012/0263238 A1* 10/2012 Miyoshi .............. H04N 19/176
375/240.16
2013/0003832 A1* 1/2013 Li ..................... H04N 19/105
375/240.12
2013/0010870 A1* 1/2013 Miyoshi .............. H04N 19/176
375/240.16

OTHER PUBLICATIONS

C. Rosewarne et al., "High Efficiency Video Coding (HEVC) Test Model 16 (HM 16) Improved Encoder Description Update 4", JCTVC-V1002, Joint Collaborative Team on Video Coding (JCT-VC) of ITU-T SG16 WP3 and ISO/IEC JTC1/SC29/WG11, Oct. 2015 (62 pages).

* cited by examiner

APPARATUS, METHOD FOR CODING VIDEO, AND NON-TRANSITORY COMPUTER-READABLE STORAGE MEDIUM FOR STORING PROGRAM FOR CODING VIDEO

CROSS-REFERENCE TO RELATED APPLICATION

This application is based upon and claims the benefit of priority of the prior Japanese Patent Application No. 2016-214802, filed on Nov. 2, 2016 the entire contents of which are incorporated herein by reference.

FIELD

The embodiment discussed herein relates to an apparatus for coding video, a method for coding video, and a non-transitory computer-readable storage medium for storing a program for coding video.

BACKGROUND

Video image data typically contain a large amount of data. For this reason, compression coding is performed when video image data is transmitted from a transmission apparatus to a reception apparatus or when video image data is stored on a storage device.

Typical video coding standards include moving picture experts group phase 2 (MPEG-2), MPEG-4, and H. 264 MPEG-4 advance video coding (MPEG-4 AVC/H. 264). These video coding standards are being formulated by the International Organization for Standardization/International Electrotechnical Commission (ISO/IEC).

In the video coding standards, two coding schemes, namely, inter-predictive coding and intra-predictive coding are adopted. The inter-predictive coding codes an coding target picture using information of a coded picture. The intra-predictive coding codes a coding target picture using only information of the coding target picture.

A next generation video coding standard called High Efficiency Video Coding (HEVC) was formulated by the organization called Joint Collaboration Team on Video Coding (JCTVC) (see non-patent literature 1 and non-patent literature 2 described below) in January 2013. JCTVC is an organization that is jointly operated by the International Telecommunication Union Telecommunication Standardization Sector (ITU-T) and ISO/IEC.

HEVC achieves a coding efficiency twice as high as H. 264 by introducing a new filter called a sample adaptive offset (SAO) and a tool that is difficult to implement because of hardware constraints when H. 264 is used.

As an extended version of HEVC, JCTVC has formulated Screen Content Coding (SCC) that is a coding standard intended for screen content application. SCC is a coding standard that is used to efficiently code artificial video, such as a desktop screen of a personal computer (PC). SCC is expected to be a coding standard in the future that may be used to compress video transmitted from a server over the cloud.

SCC is intended to handle artificial video, such as a screen on a PC. The video serving as a compression target may include a video for medical use, and a video of a computer aided design (CAD). For this reason, SCC includes a tool that accounts for a red-green-blue (RGB) color space, and a 4:4:4 color space. These videos have a higher spatial correlation of a color component than a natural image, and the number of colors used in these videos are subject to limitation in many cases. The tool added in SCC achieves an improvement in the coding efficiency by using the features of the videos.

Typical tools added in SCC are cross component prediction (CCP), adaptive color transform (ACT), and palette coding. CCP is a technique of reducing prediction errors using a correlation between the prediction errors of color components. ACT is a technique of reducing the correlation between the color components by applying a conversion from YCoCg color space to RGB color space on a prediction error.

Examples of the related art are disclosed in non-patent literature 1, JCTVC-V1005, "High Efficiency Video Coding (HEVC) Screen Content Coding: Draft 5", Joint Collaborative Team on Video Coding (JCT-VC) of ITU-T SG16 WP3 and ISO/IEC JTC1/SC29/WG11, October 2015, and non-patent literature 2, JCTVC-V1002, "High Efficiency Video Coding (HEVC) Test Model 16 (HM 16) Improved Encoder Description Update 4", Joint Collaborative Team on Video Coding (JCT-VC) of ITU-T SG16 WP3 and ISO/IEC JTC1/SC29/WG11, October 2015.

SUMMARY

According to an aspect of the invention, an apparatus for coding video in one of a plurality of prediction modes includes: a memory; and a processor coupled to the memory and configured to execute a first process that includes calculating first evaluation values regarding each of the plurality of prediction modes, based on a plurality of luminance prediction errors, each luminance prediction error being a difference between luminance of each pixel in an input image and luminance of each pixel in a prediction image, a plurality of color difference prediction errors, each color difference prediction error being a difference between a color difference of each pixel in the input image and a color difference of each pixel in the prediction image, and a calculation result of the luminance prediction errors and the color difference prediction errors; execute a second process that includes selecting a predetermined number of prediction modes from the prediction modes, based on the first evaluation values; execute a third process that includes calculating a plurality of first scaling coefficients respectively corresponding to the predetermined number of prediction modes, based on the calculation result and the luminance prediction errors, calculating a plurality of second scaling coefficients respectively corresponding to the predetermined number of prediction modes, by quantizing each of the first scaling coefficients, calculating a plurality of second evaluation values of prediction errors when the predetermined number of prediction modes and the second scaling coefficients are used; selecting one mode of the predetermined number of prediction modes and one of the second scaling coefficients, based on the second evaluation values; and execute a fourth process that includes subtracting, from a plurality of color difference prediction errors corresponding to the prediction mode selected in the third process, products of the second scaling coefficient selected in the third process and each of a plurality of luminance prediction errors corresponding to the prediction mode selected in the third process, and coding a result of the subtracting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A prediction mode and parameter to be used are determined when a video image is coded using CCP. In related art, an optimum prediction mode and parameter are not determined, possibly leading to a lower coding efficiency.

As one aspect of the present embodiment, provided are technologies for increasing the coding efficiency of the video image using CCP.

The embodiment is described with reference to the drawings. Contents described in non-patent literature 1 and non-patent literature 2 are referenced and used to support the discussion of the embodiment.

Figure 1:
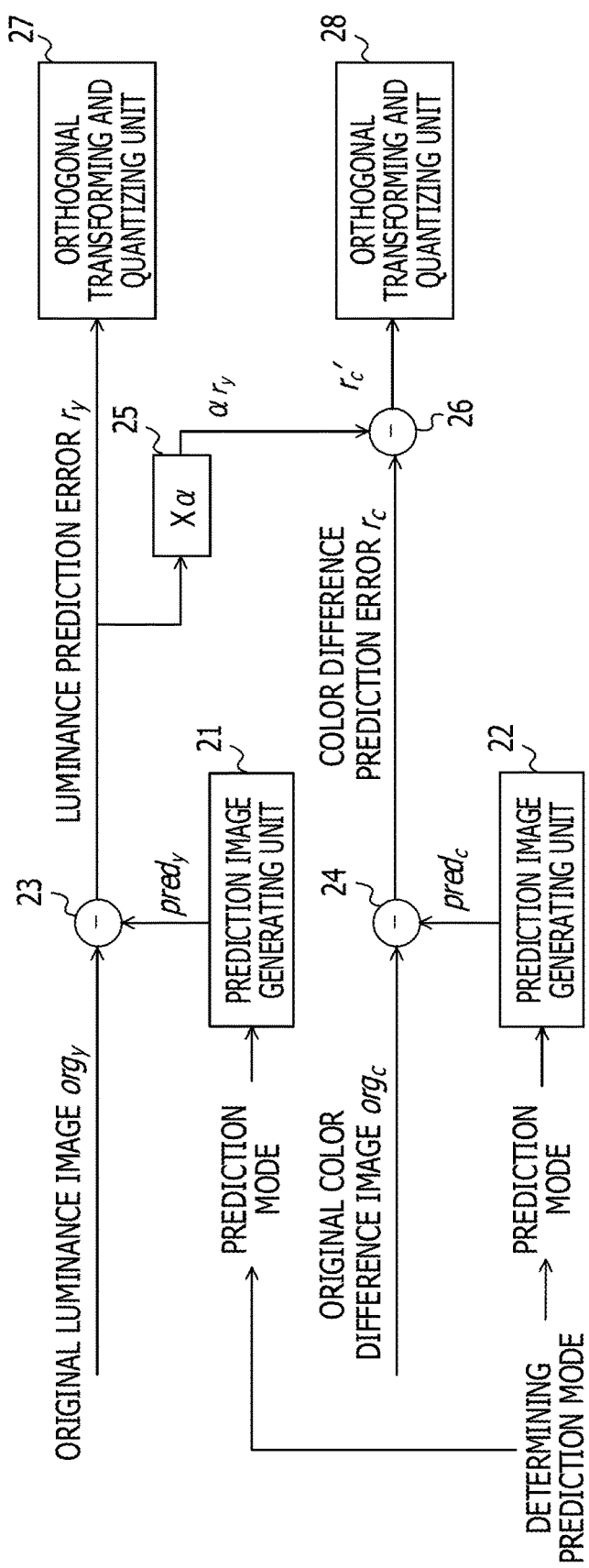
FIG. 1 illustrates a process of CCP.

A process of CCP is described below. FIG. 1 illustrates the process of CCP. Referring to FIG. 1, an original luminance image $\text{org}_y$ and an original color difference image $\text{org}_c$ are input. Note that the arrow marks representing an input relation or an output relation are not necessarily indicated at all related locations, and some locations lack arrow marks. For example, a prediction image generating unit 21 may receive the original luminance image $\text{org}_y$. A prediction image generating unit 22 may receive the original color difference image $\text{org}_c$.

A prediction mode is determined in a specific method, and based on the determined prediction method, the prediction image generating unit 21 generates a prediction luminance image $\text{pred}_y$. Based on the determined prediction mode, the prediction image generating unit 22 generates a prediction color difference image $\text{pred}_c$. A subtracter 23 subtracts from a pixel value of each pixel in the original luminance image $\text{org}_y$, a pixel value of each pixel in the prediction luminance image $\text{pred}_y$, thereby calculating a luminance prediction error $r_y(=\text{org}_y-\text{pred}_y)$. A subtracter 24 subtracts from a pixel value of each pixel in the original color difference image $\text{org}_c$, a pixel value of each pixel in the prediction color difference image $\text{pred}_c$, thereby calculating a color difference prediction error $r_c(=\text{org}_c-\text{pred}_c)$.

A multiplier 25 calculates a scaling luminance prediction error $\alpha r_y$ by multiplying a luminance prediction error $r_y$ by a scaling coefficient $\alpha$. A subtracter 26 calculates a CCP error $r_c'(=r_c-\alpha r_y)$ by subtracting from the color difference prediction error $r_c$ the scaling luminance prediction error $\alpha r_y$.

An orthogonal transforming and quantizing unit 27 performs orthogonal transform and quantization on the luminance prediction error $r_y$, thereby calculating data that serves as a coding target. An orthogonal transforming and quantizing unit 28 performs orthogonal transform and quantization on the CCP error $r_c'$, thereby calculating data that serves as a coding target. The luminance prediction error $r_y$ and the CCP error $r_c'$, orthogonally transformed and quantized, are entropy coded.

CCP calculates a difference (CCP error) by subtracting from the color difference prediction error the scaling luminance prediction error $\alpha r_y$ that is obtained by multiplying the luminance prediction error by the scaling coefficient $\alpha$, and codes the luminance prediction error and the CCP error.

CCP evaluates the prediction error in each of multiple prediction modes, and determines a prediction mode and a scaling coefficient $\alpha$ to be used, based on the evaluation results.

In accordance with the technique disclosed in the non-patent literature 2, a prediction mode that minimizes a prediction error evaluation value=$\Sigma r_y(i,j)^2+\Sigma r_c(i,j)^2$ is determined, and then the CCP scaling coefficient $\alpha$ is then determined. Here, a variable i represents a coordinate of a pixel in the x (horizontal) direction and a variable j represents a coordinate of the pixel in the y (vertical) direction.

The luminance prediction error $r_y$ and the CCP error $r_c'$ are coded when CCP used. In accordance with the non-patent literature 2, a prediction mode that minimizes a prediction error evaluation value=$\Sigma r_y(i,j)^2+\Sigma r_c(i,j)^2$ is simply determined. A prediction mode that minimizes the prediction error evaluation value=$\Sigma r_y(i,j)^2+\Sigma r_c'(i,j)^2$ including the color difference prediction error $r_c$ and CCP error $r_c'$ that are coded is not really used. From the standpoint of coding efficiency, an optimum mode may not necessarily be used in the method disclosed in the non-patent literature 2. A determination method of the prediction mode and the scaling coefficient of the embodiment are described below.

An evaluation value diff of the prediction error that is a total value of the sum of squares of the luminance prediction errors $\Sigma r_y(i,j)^2$ and the sum of squares of the CCP errors $\Sigma r_c'(i,j)^2$ is expressed in accordance with formula (1). If formula (1) is rewritten, the evaluation value diff is expressed by formula (2).

$$\text{diff} = \sum r_y(i,j)^2 + \sum r_c'(i,j)^2 \quad (1)$$

$$= \sum r_y(i,j)^2 + \sum (r_c(i,j) - \alpha r_y(i,j))^2 \quad (2)$$

$$= \alpha^2 \sum r_y(i,j)^2 - 2\alpha \sum r_y(i,j)r_c(i,j) +$$

$$\sum r_c(i,j)^2 + \sum r_y(i,j)^2$$

$$= \sum r_y(i,j)^2 \left\{ \alpha^2 - 2\alpha \frac{\sum r_y(i,j)r_c(i,j)}{\sum r_y(i,j)^2r} \right\} + \sum r_c(i,j)^2 +$$

$$\sum r_y(i,j)^2$$

$$= \sum r_y(i,j)^2 \left\{ \left( \alpha - \frac{\sum r_y(i,j)r_c(i,j)}{\sum r_y(i,j)^2} \right)^2 \right\} -$$

$$\frac{\left(\sum r_y(i,j)r_c(i,j)\right)^2}{\sum r_y(i,j)^2} + \sum r_c(i,j)^2 + \sum r_y(i,j)^2$$

Referring to formula (2), the evaluation value diff is divided into a term related to scaling (scaling term) and a term related to the prediction error only (error term).

In formula (2), the scaling term is $$\sum r_y(i,j)^2 \left\{ \left( \alpha - \frac{\sum r_y(i,j)r_c(i,j)}{\sum r_y(i,j)^2} \right)^2 \right\}$$

In formula (2), the error term is $$-\frac{\left(\sum r_y(i, j)r_c(i, j)\right)^2}{\sum r_y(i, j)^2} + \sum r_c(i, j)^2 + \sum r_y(i, j)^2$$

In the determination method of the prediction mode of the embodiment, the error term is calculated on each of multiple prediction modes prepared in advance. The multiple prediction modes prepared in advance include multiple prediction directions in intra-prediction coding, and multiple motion vectors in inter-coding.

From among the obtained multiple error terms, prediction modes responsive to a specific number of error terms ranging in the order from a smaller to a larger magnitude are selected.

The value of the scaling term may be ideally set to be zero by suitably setting the scaling coefficient $\alpha$.

More specifically, the value of the scaling term may be set to be zero by setting the scaling coefficient $\alpha$ to be $\alpha = \Sigma r_y(i,j)r_c(i,j)/\Sigma r_y(i,j)^2$.

The scaling coefficient of CCP may be a discrete value in HEVC or the like. The scaling coefficient $\alpha$ is quantized to calculate a scaling coefficient $\alpha q$ used in CCP. The scaling coefficient $\alpha q$ is one of −8/8, −4/8, −2/8, −1/8, 0/8, 1/8, 2/8, 4/8, and 8/8. The scaling coefficient $\alpha$ is quantized to a value closest to the scaling coefficients $\alpha q$. Since the scaling coefficient $\alpha q$ as a discrete value is used in HEVC, the scaling term may not necessarily be set to be zero.

The scaling coefficient $\alpha$ corresponding to a prediction mode candidate is calculated, and then quantized. Using the scaling coefficient $\alpha q$ that is obtained by quantizing the scaling coefficient $\alpha$, the evaluation value diff of the prediction error of each prediction mode candidate is calculated. A prediction mode corresponding to an evaluation value diff of a minimum prediction error from among the evaluation values diff of the calculated prediction errors and the scaling coefficient $\alpha q$ are determined to be a prediction mode and scaling coefficient $\alpha q$ to be used.

In accordance with the determination method of the prediction mode and the scaling coefficient of the embodiment, candidates of prediction modes and scaling coefficients are narrowed based on the error term of the evaluation value of the prediction error, and an evaluation value of the prediction error is calculated in view of the quantization error of the narrowed candidates using the narrowed candidates only. A suitable prediction mode and scaling coefficient are thus determined with a lower amount of calculation.

Figure 2:
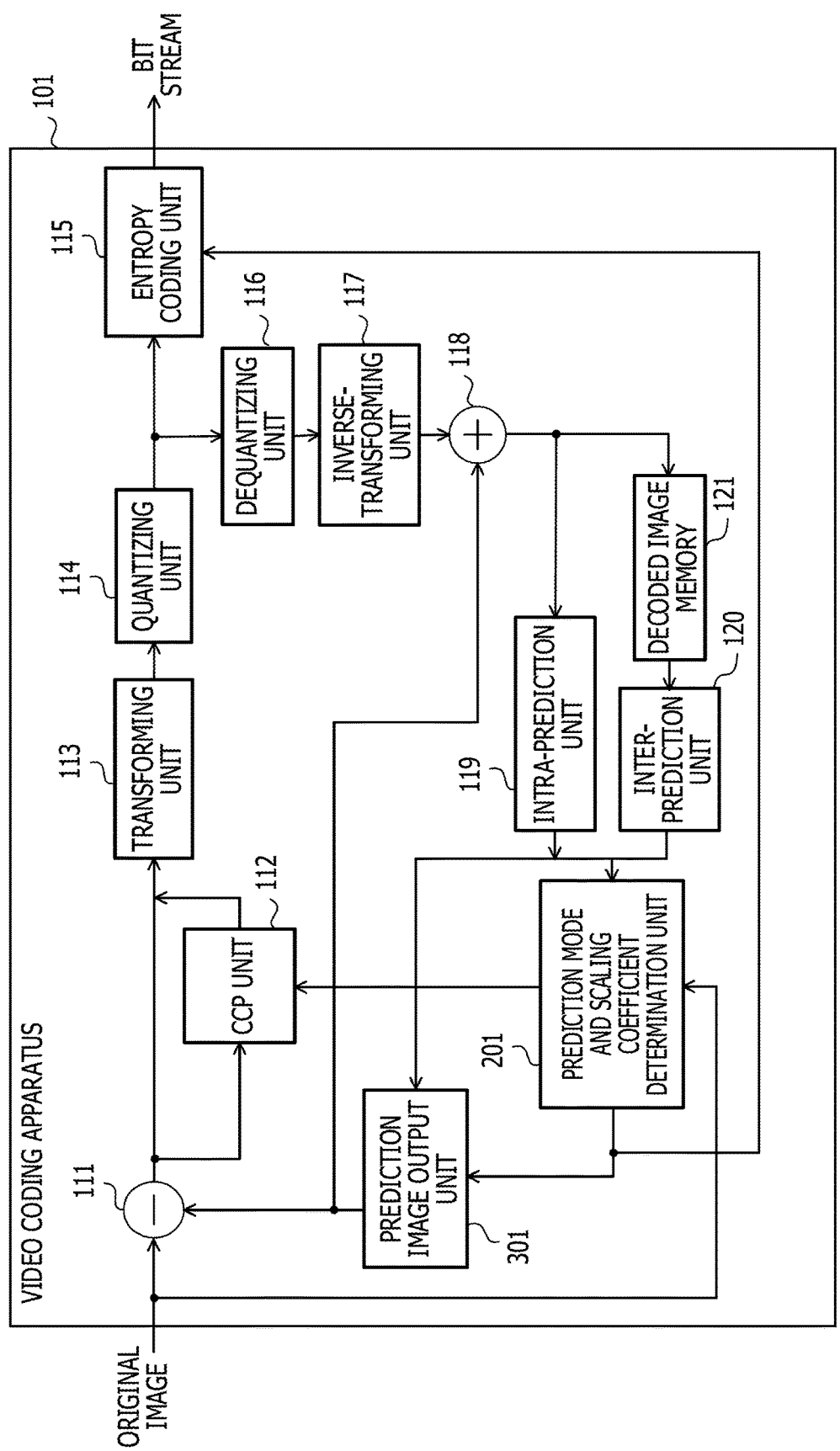
FIG. 2 illustrates a configuration of a video coding apparatus in accordance with an embodiment.

FIG. 2 illustrates a configuration of a video coding apparatus 101 in accordance with the embodiment.

The video coding apparatus 101 includes a subtracter 111, a CCP unit 112, a transforming unit 113, a quantizing unit 114, an entropy coding unit 115, a dequantizing unit 116, an inverse-transforming unit 117, an adder 118, an intra-prediction unit 119, an inter-prediction unit 120, a decoded image memory 121, a prediction mode and scaling coefficient determination unit 201, and a prediction image output unit 301.

The video coding apparatus 101 may be implemented as hardware circuits. In such a case, the circuits in the video coding apparatus 101 may be implemented as individual circuits, or may be implemented as a single integrated circuit.

The subtracter 111 outputs to the CCP unit 112 or the transforming unit 113 a difference (a prediction error) between a pixel value of each pixel in an input original image and a pixel value of each pixel in a prediction image output from the prediction image output unit 301. If coding is performed using CCP, the subtracter 111 outputs the prediction error to the CCP unit 112. If coding is performed without using CCP, the subtracter 111 outputs the prediction error to the transforming unit 113. The prediction error includes the luminance prediction error $r_y$ and the color difference prediction error $r_c$. The original image is one of multiple blocks into which one of multiple images forming a video serving as a coding target is segmented by a specific size.

The CCP unit 112 performs CCP using the scaling coefficient $\alpha q$ input from the prediction mode and scaling coefficient determination unit 201. More specifically, the CCP unit 112 calculates the CCP error $r_c'$ by subtracting from the color difference prediction error $r_c$ a scaling luminance prediction error $\alpha q r_y$, and then outputs the CCP error $r_c'$ to the transforming unit 113. The CCP unit 112 also outputs the luminance prediction error $r_y$ to the transforming unit 113.

The transforming unit 113 transforms the prediction error from a space signal to a spatial frequency signal through orthogonal transform and then outputs to the quantizing unit 114 a frequency signal that include a frequency component in a horizontal direction and a frequency component in a vertical direction.

The quantizing unit 114 quantizes the frequency signal output from the transforming unit 113 by a specific step size, and then outputs the quantized signal to the entropy coding unit 115 and the dequantizing unit 116. By quantizing the frequency signal, the quantizing unit 114 scales down the frequency signal, and thus reduces an amount of coding.

The entropy coding unit 115 entropy-codes the quantized frequency signal output from the quantizing unit 114, information regarding the prediction mode and the scaling coefficient $\alpha q$ output from the prediction mode and scaling coefficient determination unit 201. In the entropy coding, a variable length code is assigned in accordance with the number of occurrences of each symbol in the signal. The entropy coding unit 115 outputs a bit stream including a variable length code.

The dequantizing unit 116 restores the signal back to an original scale by dequantizing the output from the quantizing unit 114, and then outputs the dequantized frequency signal to the inverse-transforming unit 117.

Through inverse orthogonal transform, the inverse-transforming unit 117 restores the frequency signal output from the dequantizing unit 116 back to a spatial signal, and then outputs the reconstructed prediction error signal to the adder 118.

The adder 118 generates a decoded signal by adding a prediction image output from the prediction image output unit 301 to the reconstructed prediction error signal, and then outputs the generated decoded signal to the intra-prediction unit 119 and the decoded image memory 121.

Using a reference image, the intra-prediction unit 119 generates an intra-prediction image responsive to the original image from pixel values of surrounding pixels within a coding target image that have been coded, and outputs the intra-prediction image to the prediction image output unit 301 and the prediction mode and scaling coefficient determination unit 201.

The inter-prediction unit 120 generates an inter-prediction image by performing motion compensation on the original image using the reference image, and then outputs the inter-prediction image to the prediction image output unit 301 and the prediction mode and scaling coefficient determination unit 201.

The decoded image memory 121 stores decoded images, and then outputs the decoded images as reference images to the inter-prediction unit 120.

Through coding of the original image, the prediction mode and scaling coefficient determination unit 201 determines the prediction mode and scaling coefficient αq to be used.

Based on information indicating the prediction mode input from the prediction mode and scaling coefficient determination unit 201, the prediction image output unit 301 selects between the intra-prediction image output from the intra-prediction unit 119 and the inter-prediction image output from the inter-prediction unit 120, and outputs the selected prediction image to the subtracter 111 and the adder 118.

Figure 3:
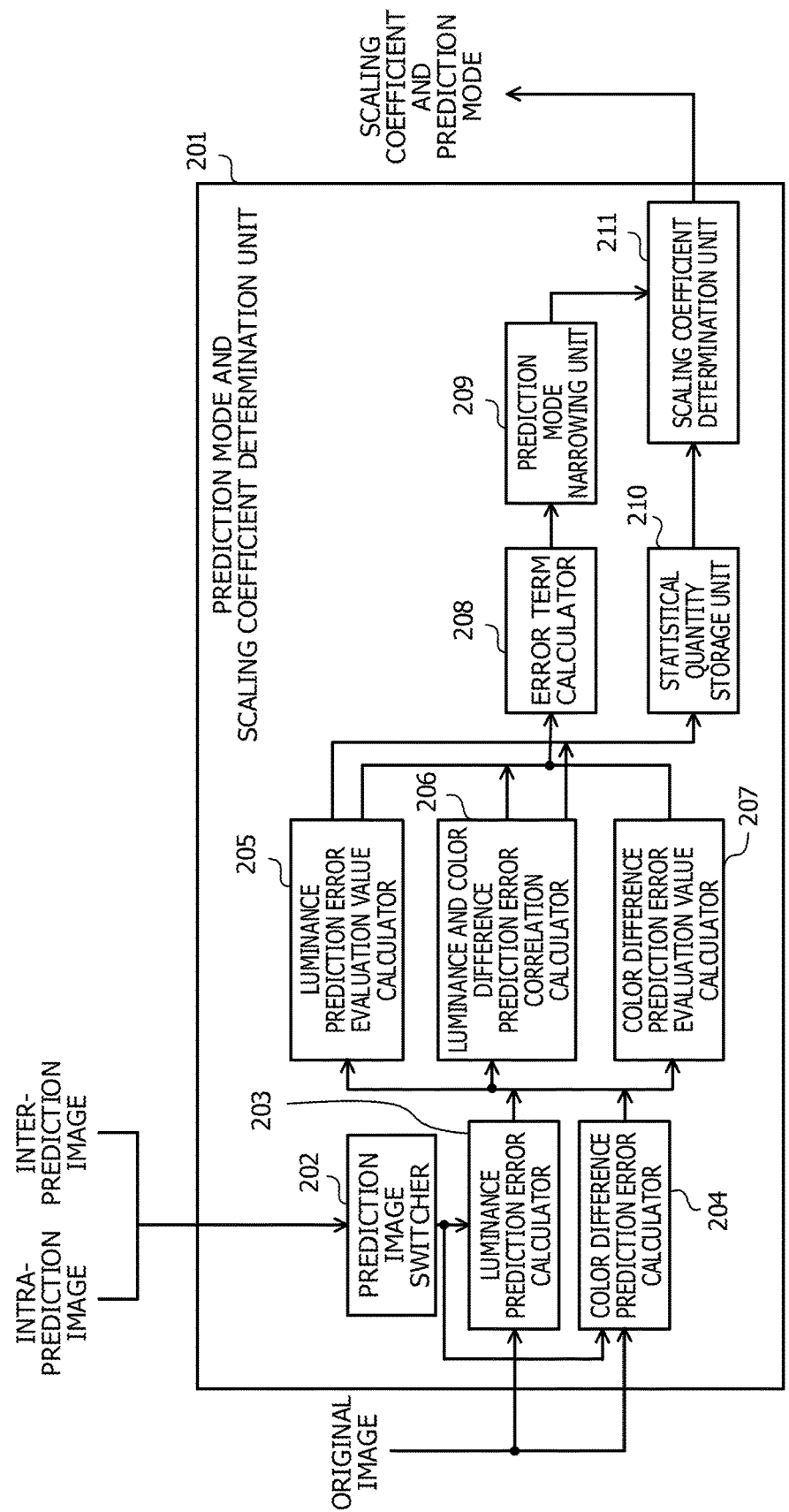
FIG. 3 illustrates a configuration of a scaling determination unit of the embodiment.

FIG. 3 illustrates the configuration of the prediction mode and scaling coefficient determination unit 201 of the embodiment.

The prediction mode and scaling coefficient determination unit 201 includes a prediction image switcher 202, a luminance prediction error calculator 203, a color difference prediction error calculator 204, a luminance prediction error evaluation value calculator 205, a luminance and color difference prediction error correlation calculator 206, a color difference prediction error evaluation value calculator 207, an error term calculator 208, a prediction mode narrowing unit 209, a statistical quantity storage unit 210, and a scaling coefficient determination unit 211.

The prediction image switcher 202 outputs as a prediction image the inter-prediction image or the inter-prediction image to the luminance prediction error calculator 203 and the color difference prediction error calculator 204.

The luminance prediction error calculator 203 calculates a luminance prediction error $r_y(i,j)$ that is a difference between a pixel value of each pixel in the original luminance image and a pixel value of each pixel in the prediction luminance image.

The color difference prediction error calculator 204 calculates a color difference prediction error $r_c(i,j)$ that is a difference between a pixel value of each pixel in the original color difference image and a pixel value of each pixel in the prediction color difference image.

The luminance prediction error evaluation value calculator 205 calculates a luminance prediction error evaluation value. The luminance prediction error evaluation value is the sum of squares of luminance prediction errors ($=\Sigma r_y(i,j)^2$). The luminance prediction error evaluation value calculator 205 outputs the calculated luminance prediction error evaluation value to the error term calculator 208 and the statistical quantity storage unit 210.

The luminance and color difference prediction error correlation calculator 206 calculates the sum of products of luminance prediction errors and color difference prediction errors ($=\Sigma r_y(i,j)r_c(i,j)$). The luminance and color difference prediction error correlation calculator 206 outputs the calculated sum of products to the error term calculator 208 and the statistical quantity storage unit 210. The sum of products of luminance prediction errors and color difference prediction errors is an example of a calculation result.

The color difference prediction error evaluation value calculator 207 calculates a color difference prediction error evaluation value. The color difference prediction error evaluation value is the sum of squares of color difference prediction errors ($=\Sigma r_c(i,j)^2$).

The error term calculator 208 calculates a value of the error term ($=-(\Sigma r_y(i,j)r_c(i,j))^2/\Sigma r_y(i,j)^2+\Sigma r_c(i,j)^2+\Sigma r_y(i,j)^2$), based on the luminance prediction error evaluation value input from the luminance prediction error evaluation value calculator 205, the color difference prediction error evaluation value input from the color difference prediction error evaluation value calculator 207, and the sum of products input from the luminance and color difference prediction error correlation calculator 206. The luminance prediction error evaluation value calculator 205, the luminance and color difference prediction error correlation calculator 206, the color difference prediction error evaluation value calculator 207, and the error term calculator 208 are an example of a calculation unit.

The prediction mode narrowing unit 209 selects, as a prediction mode candidate, a prediction mode corresponding to the value of one of the error terms consecutively ranging in an order of magnitude from a minimum value thereof to a higher value thereof from among the values of the calculated multiple error terms. The prediction mode narrowing unit 209 is an example of a selection unit. The prediction mode corresponding to the value of the error term is a prediction mode that is selected when the value of the prediction term is calculated.

The statistical quantity storage unit 210 stores the sum of squares of the luminance prediction errors output from the luminance prediction error evaluation value calculator 205 ($=\Sigma r_y(i,j)^2$) and the sum of products of the luminance prediction errors and the color difference prediction errors output from the luminance and color difference prediction error correlation calculator 206 ($=\Sigma r_y(i,j)r_c(i,j)$), in association with the prediction mode that is used when the sum of squares or the sum of products is calculated. In accordance with the embodiment, the sum of squares of the luminance prediction errors and the sum of products of the luminance prediction errors and the color difference prediction errors are referred to as a statistical quantities. The statistical quantity storage unit 210 is an example of a memory.

The scaling coefficient determination unit 211 calculates the scaling coefficient α responsive to each prediction mode candidate. The scaling coefficient α is calculated in accordance with $\alpha=\Sigma r_y(i,j)r_c(i,j)/\Sigma r_y(i,j)^2$. The scaling coefficient determination unit 211 calculates the scaling coefficient αq corresponding to each prediction mode candidate by quantizing the scaling coefficient α. Using the scaling coefficient αq corresponding to each prediction mode candidate, the scaling coefficient determination unit 211 calculates an evaluation value diff of the prediction error of each prediction mode candidate. The scaling coefficient determination unit 211 selects the prediction mode corresponding to the evaluation value diff having a minimum prediction error from among the multiple prediction modes selected by the prediction mode narrowing unit 209. The scaling coefficient determination unit 211 outputs information indicating the selected prediction mode to the CCP unit 112, the entropy coding unit 115, and the prediction image output unit 301.

The scaling coefficient determination unit 211 outputs the scaling coefficient αq corresponding to the evaluation value diff having the minimum prediction error to the CCP unit 112 and the entropy coding unit 115. The scaling coefficient determination unit 211 is an example of a processor.

Figure 4:
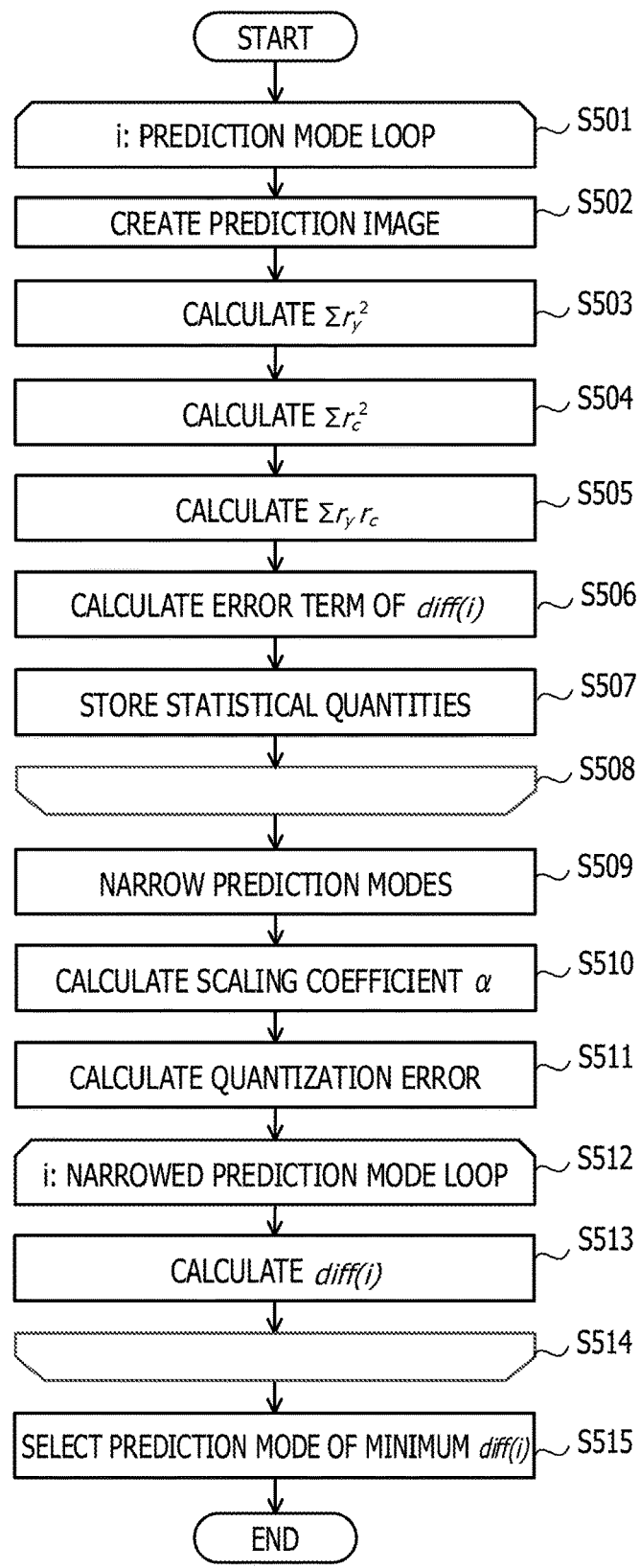
FIG. 4 is a flowchart illustrating a prediction mode and scaling coefficient determination process of the embodiment.

FIG. 4 is a flowchart illustrating a prediction mode and scaling coefficient determination process of the embodiment.

Step S501 is a start of a prediction mode loop. In step S501, the video coding apparatus 101 selects one of unselected prediction modes from multiple prediction modes prepared in advance.

In step S502, the intra-prediction unit 119 generates the intra-prediction image or the inter-prediction unit 120 generates the intra-prediction image in accordance with the selected prediction mode. Based on the selected prediction mode, the prediction image switcher 202 outputs as a prediction image an inter-prediction image or an intra-prediction image to the luminance prediction error calculator 203 and the color difference prediction error calculator 204.

In step S503, the luminance prediction error evaluation value calculator 205 calculates the luminance prediction error evaluation value $(=\Sigma r_y(i,j)^2)$.

In step S504, the color difference prediction error evaluation value calculator 207 calculates the color difference prediction error evaluation value $(=\Sigma r_c(i,j)^2)$.

In step S505, the luminance and color difference prediction error correlation calculator 206 calculates the sum of products of the luminance prediction errors and the color difference prediction errors $(=\Sigma r_y(i,j)r_c(i,j))$.

Operations in steps S503 through S504 may be performed in parallel, or with the order of execution thereof changed.

In step S506, the error term calculator 208 calculates the value of the error term corresponding to the selected prediction mode. The error term calculator 208 calculates the value of the error term corresponding to the selected prediction mode, using the luminance prediction error evaluation value input from the luminance prediction error evaluation value calculator 205, the color difference prediction error evaluation value input from the color difference prediction error evaluation value calculator 207, and the sum of products input from the luminance and color difference prediction error correlation calculator 206.

In step S507, the luminance prediction error evaluation value calculator 205 outputs the calculated luminance prediction error evaluation value to the statistical quantity storage unit 210. The luminance and color difference prediction error correlation calculator 206 outputs the calculated sum of products to the statistical quantity storage unit 210. The statistical quantity storage unit 210 stores the statistical quantities output from the luminance prediction error evaluation value calculator 205 and the luminance and color difference prediction error correlation calculator 206 (the luminance prediction error evaluation value and the sum of products) in association with the selected prediction mode.

Steps S506 and S507 may be performed in parallel, or with the order of execution thereof changed.

Step S508 is the end of the loop that starts in step S501. If there is still an unselected mode from among the multiple prediction modes that are prepared in advance, control returns to step S501. If the multiple prediction modes that are prepared in advance are all selected (in other words, all the error terms of the multiple prediction modes that are prepared in advance have been calculated), control proceeds to step S509.

In step S509, the prediction mode narrowing unit 209 selects, as the prediction mode candidates, prediction modes corresponding to the error terms of a specific number (for example, 3 to 5) successively ranging from the one having the smallest value, from among the values of the calculated multiple error terms. The selected prediction mode candidates are referred to as prediction mode candidates.

In step S510, the scaling coefficient determination unit 211 calculates the scaling coefficient α corresponding to each prediction mode candidate.

In step S511, the scaling coefficient determination unit 211 quantizes the scaling coefficient α corresponding to each prediction mode candidate, and then calculates the scaling coefficient αq. Using the scaling coefficient αq and the statistical quantities stored on the statistical quantity storage unit 210, the scaling coefficient determination unit 211 calculates a quantization error corresponding to each prediction mode candidate. The quantization error is $(\alpha q - (\Sigma r_y(i,j)r_c(i,j)/\Sigma r_y(i,j)^2)^2$. The previously calculated statistical quantities $(\Sigma r_y(i,j)r_c(i,j)$ and $\Sigma r_y(i,j)^2)$ are retrieved from the statistical quantity storage unit 210, and used to calculate the quantization error. This operation is free from re-calculating $\Sigma r_y(i,j)r_c(i,j)$ and $\Sigma r_y(i,j)^2$ and leads to a reduction in the amount of calculation.

In step S512 at a start of a narrowed prediction loop, one unselected prediction mode candidate is selected from the prediction mode candidates of the specific number.

In step S513, the scaling coefficient determination unit 211 calculates the evaluation value diff corresponding to each prediction mode candidate (see formula (2)). To calculate the evaluation value diff of the prediction error, the scaling coefficient determination unit 211 may use the value of the error term calculated in step S506, the quantization error calculated in step S511, and the statistical quantities stored on the statistical quantity storage unit 210 $(\Sigma r_y(i,j)^2)$. The scaling coefficient determination unit 211 thus calculates the evaluation value diff of the prediction error=$\Sigma r_y(i,j)^2$*quantization error+error term. The scaling coefficient determination unit 211 calculates the evaluation value diff of the prediction error using the previously calculated value of the error term, quantization error and $\Sigma r_y(i,j)^2$. Since the scaling coefficient determination unit 211 is free from re-calculating $\Sigma r_y(i,j)^2$, $\Sigma r_c(i,j)^2$, and $\Sigma r_y(i,j)r_c(i,j)$, the amount of calculation may be reduced.

Step S514 is an end of the loop that has started in step S512. In step S512, if there is still an unselected prediction mode candidate from among the prediction mode candidates, control returns to step S512. If all the prediction mode candidates have been selected in step S512 (in other words, the evaluation values diff of the prediction errors of all the prediction mode candidates have been calculated), control proceeds to step S515.

In step S515, the scaling coefficient determination unit 211 determines (selects) the prediction mode corresponding to the evaluation value diff having a minimum prediction error as a prediction mode that is used to code the original image. Also, the scaling coefficient determination unit 211 determines (selects) the scaling coefficient αq corresponding to the evaluation value diff having the minimum prediction error as a scaling coefficient αq that is used to code the original image. The scaling coefficient determination unit 211 outputs information indicating the selected prediction mode to the CCP unit 112, the entropy coding unit 115, and the prediction image output unit 301. The scaling coefficient determination unit 211 outputs the selected scaling coefficient αq to the CCP unit 112 and the entropy coding unit 115.

The video coding apparatus 101 of the embodiment may determine an optimum prediction mode that reduces the prediction error of luminance and the CCP error that are to be coded when the video is coded using CCP. The coding efficiency is thus improved. The video coding apparatus 101 of the embodiment reduces the amount of calculation when the scaling coefficient to be used in CCP is determined.

Figure 5:
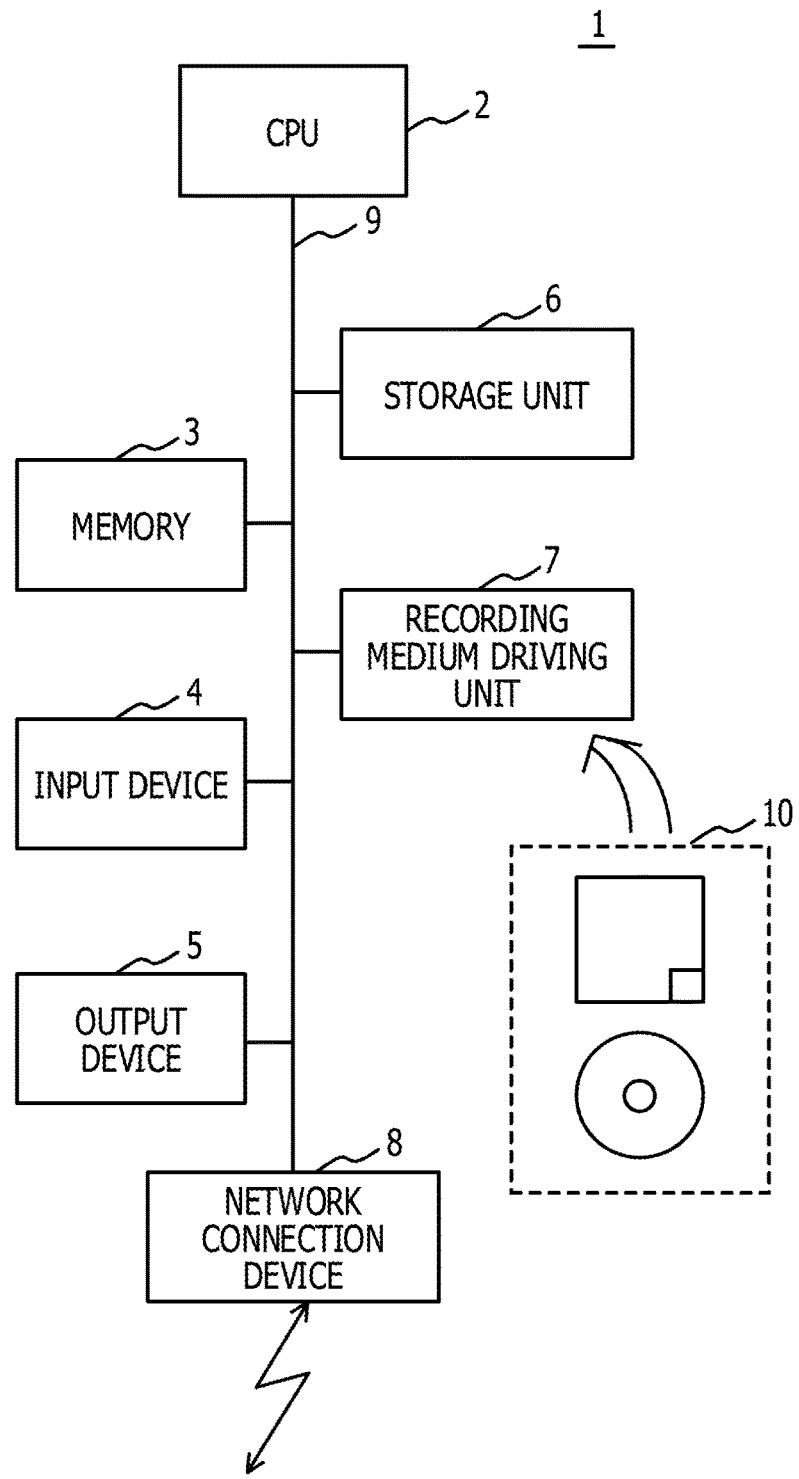
FIG. 5 illustrates a configuration of an information processing apparatus (computer).

FIG. 5 illustrates a configuration of an information processing apparatus 1 (computer).

The video coding apparatus 101 of FIG. 2 may be implemented using a hardware circuit or may be implemented using the information processing apparatus 1 of FIG. 5.

The information processing apparatus 1 includes a central processing unit (CPU) 2, a memory 3, an input device 4, an output device 5, a storage unit 6, a recording medium driving unit 7, a network connection device 8, and a bus 9 that interconnects these elements.

The CPU 2 is a central processing unit that controls the whole information processing apparatus 1. The CPU 2 operates as the subtracter 111, the CCP unit 112, the transforming unit 113, the quantizing unit 114, the entropy coding unit 115, the dequantizing unit 116, the inverse-transforming unit 117, the adder 118, the intra-prediction unit 119, the inter-prediction unit 120, the prediction mode and scaling coefficient determination unit 201, and the prediction image output unit 301.

The memory 3 may include a read-only memory (ROM), a random-access memory (RAM). The memory 3 temporarily stores a program or data that is stored on the storage unit 6 (or a portable recording medium 10). The CPU 2 executes the variety of processes described above, by executing the program on the memory 3. The memory 3 corresponds to the decoded image memory 121, and the statistical quantity storage unit 210.

A program code read from the portable recording medium 10 or the like implements the functionalities of the embodiment.

The input device 4 is used to input a command or information from a user or an operator, and to acquire data to be used in the information processing apparatus 1. The input device 4 may include a keyboard, a mouse, a touch-panel, a camera, and/or a sensor.

The output device 5 outputs an enquiry or process results to the user or operator, and operates under the control of the CPU 2. The output device 5 may be a display or a printer, for example.

The storage unit 6 may be a magnetic disk, an optical disk, or a tape device. The information processing apparatus 1 stores the program and data on the storage unit 6, and reads and uses the program and data from the memory 3 as appropriate.

The recording medium driving unit 7 drives the portable recording medium 10, thereby accessing contents recorded on the portable recording medium 10. The recording media may include any of computer-readable recording media, including a memory card, a flexible disk, a compact disk read-only memory (CD-ROM), an optical disk, and a magneto-optical disk. The user has stored the program and data on the portable recording medium 10, and then reads the program and data onto the memory 3 to use them.

The network connection device 8 is a communication interface that is connected to any communication network, such as a local-area network (LAN) or a wide-area network (WAN), and performs data conversion in communication. The network connection device 8 transmits data to an apparatus connected thereto via the communication network, or receives data from an apparatus connected thereto via the communication network.

The information processing apparatus 1 may not necessarily have to include all elements of FIG. 5, and some elements may be omitted therefrom depending on applications and conditions. For example, if an interface with the user or operator is not used, the input device 4 and the output device 5 may be omitted. If the information processing apparatus 1 does not access the portable recording medium 10, the recording medium driving unit 7 may be omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus for coding video in one of a plurality of prediction modes, the apparatus comprising:
  a memory; and
  a processor coupled to the memory and configured to
    execute a first process that includes calculating first evaluation values regarding each of the plurality of prediction modes, based on a plurality of luminance prediction errors, each luminance prediction error being a difference between luminance of each pixel in an input image and luminance of each pixel in a prediction image, a plurality of color difference prediction errors, each color difference prediction error being a difference between a color difference of each pixel in the input image and a color difference of each pixel in the prediction image, and a calculation result of the luminance prediction errors and the color difference prediction errors;
    execute a second process that includes selecting a predetermined number of prediction modes from the plurality of prediction modes, based on the first evaluation values;
    execute a third process that includes
    calculating a plurality of first scaling coefficients respectively corresponding to the predetermined number of prediction modes, based on the calculation result and the luminance prediction errors,
    calculating a plurality of second scaling coefficients respectively corresponding to the predetermined number of prediction modes, by quantizing each of the first scaling coefficients,
    calculating a plurality of second evaluation values of prediction errors when the predetermined number of prediction modes and the second scaling coefficients are used;
    selecting one mode of the predetermined number of prediction modes and one of the second scaling coefficients, based on the second evaluation values; and
    execute a fourth process that includes
    subtracting, from a plurality of color difference prediction errors corresponding to the prediction mode selected in the third process, products of the second scaling coefficient selected in the third process and each of a plurality of luminance prediction errors corresponding to the prediction mode selected in the third process, and coding a result of the subtracting.

2. The apparatus according to claim 1, wherein the second process includes selecting the predetermined number of prediction modes corresponding to the predetermined number of first evaluation values consecutively ranging in an order of magnitude from a minimum value thereof to a higher value thereof.

3. The apparatus according to claim 1, wherein the third process includes selecting a second scaling coefficient and a prediction mode corresponding to one of the second evaluation values having a minimum value.

4. The apparatus according to claim 1, wherein the first process includes
calculating a first sum of squares of the luminance prediction errors respectively corresponding to the plurality of prediction modes,
calculating a second sum of squares of the color difference prediction errors respectively corresponding to the plurality of prediction modes,
calculating as the calculation result a sum of products, the products obtained by multiplying the luminance prediction errors respectively by the color difference errors in the plurality of prediction modes, and
storing on the memory the first sum of squares and the sum of products; and wherein the third process includes calculating the second evaluation values in the predetermined number of prediction modes, using the first sum and the sum of products stored on the memory.

5. A method performed by a computer for coding video in one of a plurality of prediction modes, the method comprising:
executing, by a processor of the computer, a first process that includes calculating first evaluation values regarding each of the plurality of prediction modes, based on a plurality of luminance prediction errors, each luminance prediction error being a difference between luminance of each pixel in an input image and luminance of each pixel in a prediction image, a plurality of color difference prediction errors, each color difference prediction error being a difference between a color difference of each pixel in the input image and a color difference of each pixel in the prediction image, and a calculation result of the luminance prediction errors and the color difference prediction errors;
executing, by the processor of the computer, a second process that includes selecting a predetermined number of prediction modes from the plurality of prediction modes, based on the first evaluation values;
executing, by the processor of the computer, a third process that includes
calculating a plurality of first scaling coefficients respectively corresponding to the predetermined number of prediction modes, based on the calculation result and the luminance prediction errors,
calculating a plurality of second scaling coefficients respectively corresponding to the predetermined number of prediction modes, by quantizing each of the first scaling coefficients,
calculating a plurality of second evaluation values of prediction errors when the predetermined number of prediction modes and the second scaling coefficients are used;
selecting one mode of the predetermined number of prediction modes and one of the second scaling coefficients, based on the second evaluation values; and
executing, by the processor of the computer, a fourth process that includes
subtracting, from a plurality of color difference prediction errors corresponding to the prediction mode selected in the third process, products of the second scaling coefficient selected in the third process and each of a plurality of luminance prediction errors corresponding to the prediction mode selected in the third process, and coding a result of the subtracting.

6. The method according to claim 5, wherein the second process includes selecting the predetermined number of prediction modes corresponding to the predetermined number of first evaluation values consecutively ranging in an order of magnitude from a minimum value thereof to a higher value thereof.

7. The method according to claim 5, wherein the third process includes selecting a second scaling coefficient and a prediction mode corresponding to one of the second evaluation values having a minimum value.

8. The method according to claim 5, wherein the first process includes
calculating a first sum of squares of the luminance prediction errors respectively corresponding to the plurality of prediction modes,
calculating a second sum of squares of the color difference prediction errors respectively corresponding to the plurality of prediction modes,
calculating as the calculation result a sum of products, the products obtained by multiplying the luminance prediction errors respectively by the color difference errors in the plurality of prediction modes, and
storing on the memory the first sum of squares and the sum of products; and wherein the third process includes calculating the second evaluation values in the predetermined number of prediction modes, using the first sum and the sum of products stored on the memory.

9. A non-transitory computer-readable storage medium for storing a program that causes a processor to execute a process for coding video in one of a plurality of prediction modes, the process comprising:
executing a first process that includes calculating first evaluation values regarding each of the plurality of prediction modes, based on a plurality of luminance prediction errors, each luminance prediction error being a difference between luminance of each pixel in an input image and luminance of each pixel in a prediction image, a plurality of color difference prediction errors, each color difference prediction error being a difference between a color difference of each pixel in the input image and a color difference of each pixel in the prediction image, and a calculation result of the luminance prediction errors and the color difference prediction errors;
executing a second process that includes selecting a predetermined number of prediction modes from the plurality of prediction modes, based on the first evaluation values;
executing a third process that includes
calculating a plurality of first scaling coefficients respectively corresponding to the predetermined number of prediction modes, based on the calculation result and the luminance prediction errors,
calculating a plurality of second scaling coefficients respectively corresponding to the predetermined number of prediction modes, by quantizing each of the first scaling coefficients,
calculating a plurality of second evaluation values of prediction errors when the predetermined number of prediction modes and the second scaling coefficients are used;
selecting one mode of the predetermined number of prediction modes and one of the second scaling coefficients, based on the second evaluation values; and
executing a fourth process that includes
subtracting, from a plurality of color difference prediction errors corresponding to the prediction mode selected in the third process, products of the second scaling coefficient selected in the third process and each of a plurality of luminance prediction errors corresponding to the prediction mode selected in the third process, and coding a result of the subtracting.

10. The non-transitory computer-readable storage medium according to claim 9, wherein the second process includes selecting the predetermined number of prediction modes corresponding to the predetermined number of first evaluation values consecutively ranging in an order of magnitude from a minimum value thereof to a higher value thereof.

11. The non-transitory computer-readable storage medium according to claim 9, wherein the third process includes selecting a second scaling coefficient and a prediction mode corresponding to one of the second evaluation values having a minimum value.

12. The non-transitory computer-readable storage medium according to claim 9, wherein the first process includes calculating a first sum of squares of the luminance prediction errors respectively corresponding to the plurality of prediction modes, calculating a second sum of squares of the color difference prediction errors respectively corresponding to the plurality of prediction modes, calculating as the calculation result a sum of products, the products obtained by multiplying the luminance prediction errors respectively by the color difference errors in the plurality of prediction modes, and storing on the memory the first sum of squares and the sum of products;

and wherein the third process includes calculating the second evaluation values in the predetermined number of prediction modes, using the first sum and the sum of products stored on the memory.

\* \* \* \* \*